(12) United States Patent
Kranz

(10) Patent No.: US 6,928,159 B2
(45) Date of Patent: Aug. 9, 2005

(54) TELEPHONE FOR CONNECTION TO A PUBLIC TELEPHONE NETWORK

(75) Inventor: Christian Kranz, Ratingen Lintorf (DE)

(73) Assignee: Infineon Technologies AG, Munich (DE)

( * ) Notice: Subject to any disclaimer, the term of this patent is extended or adjusted under 35 U.S.C. 154(b) by 15 days.

(21) Appl. No.: 10/410,961

(22) Filed: Apr. 10, 2003

(65) Prior Publication Data

US 2003/0179879 A1 Sep. 25, 2003

Related U.S. Application Data

(63) Continuation of application No. PCT/DE01/03800, filed on Oct. 2, 2001.

(30) Foreign Application Priority Data

Oct. 10, 2000 (DE) .......................................... 100 50 041

(51) Int. Cl.[7] .............................................. H04M 19/00
(52) U.S. Cl. .............. 379/387.02; 379/395; 379/395.01
(58) Field of Search ............................ 379/387.02, 395, 379/395.01

(56) References Cited

U.S. PATENT DOCUMENTS

| 4,203,006 | A | * | 5/1980 | Mascia ..................... 379/93.28 |
| 4,661,979 | A |   | 4/1987 | Jakab |
| 4,827,461 | A | * | 5/1989 | Sander ......................... 379/68 |
| 5,289,529 | A | * | 2/1994 | Karnowski ................... 379/395 |
| 5,442,694 | A |   | 8/1995 | Chitrapu et al. |
| 5,796,815 | A |   | 8/1998 | Guercio et al. |
| 5,848,150 | A | * | 12/1998 | Bingel ..................... 379/399.01 |
| 6,081,586 | A |   | 6/2000 | Rahamim et al. |
| 6,205,219 | B1 | * | 3/2001 | Hollenbach et al. ..... 379/93.36 |
| 6,577,965 | B1 | * | 6/2003 | Morcillo Martinez .. 379/114.07 |

FOREIGN PATENT DOCUMENTS

| DE | 35 44 394 A1 | 6/1987 |
| DE | 691 07 770 T2 | 4/1992 |
| DE | 43 16 533 A1 | 11/1994 |
| DE | 196 06 148 A1 | 9/1997 |
| EP | 0 137 901 A2 | 4/1985 |
| EP | 0 703 690 A1 | 3/1996 |
| EP | 0 938 221 A2 | 8/1999 |
| FR | 2551604 A1 * | 3/1985 | .......... H04M/15/28 |
| WO | 96/15601 | 5/1996 |

* cited by examiner

*Primary Examiner*—Sinh Tran
*Assistant Examiner*—Daniel Swerdlow
(74) *Attorney, Agent, or Firm*—Laurence A. Greenberg; Werner H. Stemer; Ralph E. Locher

(57) ABSTRACT

In the case of the inventive telephone, telephone operating signals (bell signal, charge-unit signals and caller identifiers) and audio signals are processed together by an integrated circuit. This requires signal level matching to be performed for the individual signals. Since the telephone signals are processed together by a chip, preferably by a digital signal processor, the hitherto required complexity for discrete components can be reduced.

22 Claims, 2 Drawing Sheets

TELEPHONE FOR CONNECTION TO A PUBLIC TELEPHONE NETWORK

CROSS-REFERENCE TO RELATED APPLICATION

This application is a continuation of copending International Application No. PCT/DE01/03800, filed Oct. 2, 2001, which designated the United States and was not published in English.

BACKGROUND OF THE INVENTION

Field of the Invention

The invention relates to a telephone which receives audio signals and telephone operating signals via a public telephone network and to a method for processing audio signals and telephone operating signals in a telephone.

The public telephone network is used to transmit various types of telephone operating signals which have completely different signal levels. One of the telephone operating signals is the bell signal, which has an amplitude of 120 V. The DC voltage component of this signal is 60 V. In addition, the public telephone network is used to transmit charge-unit signals (meter pulse signals) whose signal amplitude is 12 V. Furthermore, caller identification signals are transmitted via the network (CID: Caller Identification).

There are historical reasons for the very different signal levels of the individual telephone operating signals. Thus, the bell signal was originally used to actuate mechanical bell devices electromagnetically. The short AC voltage pulses of the meter pulse signal were used as metering pulses for a mechanical charge meter.

On account of the very different voltage levels of the various signals, it is also necessary in modern telephones for these signals to be removed from the reception path using discrete components and processed separately. Hence, to date, every telephone needs to contain separate, discretely designed evaluation circuits for the various types of telephone operating signals.

Added to this, different standards exist for the various telephone operating signals in various countries. First, the signal levels of the bell signal, of the meter pulse signal etc. differ from one another in the various national public telephone networks. Second, the various telephone operating signals are also transmitted in different formats. While some national standards make provision for the caller identifier to be transmitted in FSK (Frequency Shift Keying) format, other standards require that this identifier be transmitted in DTMF (Dual Tone MultiFrequency) format. To be able to evaluate these caller identifiers on the basis of the various national standards, additional, discretely designed evaluation circuits are therefore required. A telephone that is produced in large quantities and needs to be able to be used in various countries therefore needs to be equipped with various discrete evaluation circuits. The advantage of larger quantities is therefore confronted by the drawback of increased component complexity.

SUMMARY OF THE INVENTION

It is accordingly an object of the invention to provide a telephone and a method for processing telephone signals, which overcome the above-mentioned disadvantages of the prior art apparatus and methods of this general type.

In particular, it is an object of the invention to provide a telephone and a method for processing telephone signals that can be implemented with lower component complexity and that allows matching to various public telephone network standards.

With the foregoing and other objects in view there is provided, in accordance with the invention, a telephone for connection to a public telephone network. The telephone includes a signal shaping device for obtaining first telephone operating signals in a waiting mode and for obtaining audio signals and second telephone operating signals in a call mode. The signal shaping device provides shaped first telephone operating signals in the waiting mode and provides shaped audio signals and shaped second telephone operating signals in the call mode. The telephone also includes at least one integrated circuit for processing the shaped first telephone operating signals, the shaped audio signals, and the shaped second telephone operating signals.

In accordance with an added feature of the invention, the signal shaping device adjusts a signal level of the first telephone operating signals, the audio signals, and the second telephone operating signals depending on a type of signal obtained.

In accordance with an additional feature of the invention, the signal shaping device adjusts a signal level of the first telephone operating signals, the audio signals, and the second telephone operating signals depending on whether the telephone is in the waiting mode or the call mode.

In accordance with another feature of the invention, the integrated circuit is an integrated analog circuit.

In accordance with a further feature of the invention, the integrated circuit includes an analog/digital converter unit and a digital signal processor unit configured downstream from the analog/digital converter unit.

In accordance with a further added feature of the invention, the first telephone operating signals obtained during the waiting mode include bell signals, charge-unit signals, and caller identifiers.

In accordance with a further additional feature of the invention, the second telephone operating signals received during the call mode include charge-unit signals and caller identifiers.

In accordance with another further feature of the invention, the integrated circuit has separate inputs for obtaining the first telephone operating signals in the waiting mode and for obtaining the second telephone operating signals and the audio signals in the call mode.

In accordance with an added further feature of the invention, a downstream processing stage is provided for receiving, in a multiplex mode, the first telephone operating signals in the waiting mode and the second telephone operating signals and the audio signals in the call mode.

In accordance with an additional further feature of the invention, there are provided, a plurality of access lines for connection to a public telephone network. The signal shaping device includes a voltage-dependent resistor connecting the plurality of access lines to one another.

In accordance with yet an added feature of the invention, there is provided, a signal path for the first telephone operating signals in the waiting mode. The signal shaping device includes differential AC elements for decoupling the signal path from a public telephone network.

In accordance with yet an additional feature of the invention, the signal shaping device includes high-resistance voltage dividers configured in the signal path downstream from the differential AC elements.

In accordance with yet another feature of the invention, the signal shaping device includes at least one controllable amplifier unit.

In accordance with yet a further feature of the invention, the signal shaping device includes at least one circuit for determining maximum level values, the controllable amplifier unit having a gain being set by the level values.

In accordance with another added feature of the invention, the integrated circuit includes an analog/digital converter; and the controllable amplifier unit is a range selector circuit for the analog/digital converter.

In accordance with another additional feature of the invention, the signal shaping device includes at least one frequency-selective attenuation element.

In accordance with an added feature of the invention, there is provided, a signal path for obtaining the second telephone operating signals and the audio signals in the call mode. The frequency-selective attenuation element is configured in the signal path for obtaining the second telephone operating signals and the audio signals in the call mode.

In accordance with an additional feature of the invention, the frequency-selective attenuation element includes a parallel resonant circuit.

In accordance with a further feature of the invention, the parallel resonant circuit has a resonant frequency matching a frequency of a particular type of received telephone operating signals.

In accordance with a further added feature of the invention, a resistor is connected in parallel with the parallel resonant circuit.

In accordance with a further additional feature of the invention, the integrated circuit has a plurality of inputs; and the signal shaping device includes a plurality of overvoltage protection elements for protecting the plurality of inputs of the integrated circuit.

With the foregoing and other objects in view there is provided, in accordance with the invention, a method for processing telephone operating signals and audio signals in a telephone. The method includes steps of: receiving first telephone operating signals in a waiting mode and receiving second telephone operating signals and audio signals in a call mode; performing level matching depending on a mode and/or on a type of telephone operating signals received; and evaluating the first telephone operating signals, the second telephone operating signals, and the audio signals together.

In accordance with an added mode of the invention, the method includes using at least one integrated analog circuit to perform the evaluating step.

In accordance with an additional mode of the invention, the method includes providing the integrated circuit with an analog/digital converter unit and a digital signal processor unit configured downstream from the analog/digital converter unit.

In accordance with another mode of the invention, the first telephone operating signals received during the waiting mode include bell signals, charge-unit signals, and caller identifiers.

In accordance with a further mode of the invention, the second telephone operating signals received during the call mode include charge-unit signals and caller identifiers.

In accordance with a further added mode of the invention, the method includes performing the level matching step by connecting a voltage-dependent resistor between a plurality of access lines to a public telephone network.

In accordance with a further additional mode of the invention, the method includes performing the level matching step with differential AC elements decoupling a signal path for signals received in the waiting mode from a public telephone network.

In accordance with a further added mode of the invention, the method includes performing the level matching step using high-resistance voltage dividers configured in a signal path downstream from the differential AC elements.

In accordance with another added mode of the invention, the method includes performing the level matching step by controlling a gain.

In accordance with another further mode of the invention, the level matching step is performed by first detecting a signal peak of signals that have been received and then controlling the gain based on the signal peak that has been detected.

In accordance with yet an added mode of the invention, the method includes controlling the gain by selecting a range for an analog/digital converter.

In accordance with yet an additional mode of the invention, the method includes performing the level matching step by using a frequency-selective attenuation element.

In accordance with yet another mode of the invention, the method includes performing the level matching step by using a parallel resonant circuit having a resonant frequency matching a frequency of a particular type of received telephone operating signals.

In accordance with yet a further mode of the invention, the method includes performing the level matching step by using overvoltage protection elements.

In accordance with yet a further added mode of the invention, the method includes processing the first telephone operating signals received in the waiting mode and the second telephone operating signals and audio signals received in a call mode in a multiplex mode.

The inventive telephone is suitable for connection to a public telephone network and can be operated either in a waiting mode or a call mode. Normally, the waiting mode is equivalent to the operating mode with the receiver on hook. In the waiting mode, first telephone operating signals are received. These can be bell signals, for example. In the call mode, audio signals, which are primarily voice signals, and second telephone operating signals are received, for example charge-unit signals.

In line with the invention, the telephone includes signal shaping device which, depending on the mode and/or on the type of telephone operating signals received, perform signal shaping on these signals. In addition, the telephone includes at least one integrated circuit which processes both the audio signals and the telephone operating signals. This measure allows discretely designed circuits which were used for removing the various telephone operating signals to be dispensed with completely. This allows a less expensive and more compact design for the telephone.

The telephone signals are evaluated together by integrated circuits. These integrated circuits can be analog circuits or digital signal processors. This means that the telephone signals, which are very different for historical reasons, can be subjected to standard signal evaluation. This allows telephone operating signals such as caller identifiers, which have to date been able to be evaluated only in more expensive telephones, to be processed in less expensive appliances as well.

Another advantage of evaluating the signals together is that the manner of signal evaluation can be altered by reprogramming the integrated circuit. This allows the telephone to be matched to the telephone standards in various countries and particularly to the differently stipulated telephone operating signals. In particular, it is possible to produce a telephone which can process all the telephone standards used in Europe.

In line with one advantageous embodiment of the invention, the signal levels of the signals received are adjusted by the signal shaping device depending on the mode and/or on the type of signal received. The signals received via the public telephone network are characterized by extremely different signal levels. The bell signals have an amplitude of 120 V (with a DC voltage component of approximately 60 V), the maximum level values of the meter pulse signals are approximately 12 V, and the amplitude of the voice signals is approximately 3 V. If the signals received are to be processed together by at least one integrated circuit, then they first need to be shaped such that their signal levels approximately correspond to one another after shaping. This is the task of the signal shaping device.

In another advantageous refinement of the invention, the at least one integrated circuit is an integrated analog circuit. This has the advantage that analog/digital conversion and subsequent digital/analog conversion of the audio signals can be dispensed with. The signals received can be subjected to analog processing throughout; digital intermediate processing of the signals becomes superfluous.

As an alternative, it is advantageous if the at least one integrated circuit includes an analog/digital converter unit and a digital signal processor unit arranged downstream. In this case, the analog/digital converter and the digital signal processor are preferably integrated on one chip, so that the entire signal processing can be performed by (at least) one integrated circuit. For the signal processing, there is currently a trend toward using digital signal processors. As soon as the received signal is available in digitized form, it can be processed further by a digital signal processor unit in a manner which can be defined as desired. In the present case, simple reprogramming allows the signal processing to be matched to the public telephone network standards in various countries. In this regard, digital signal processors allow more flexible evaluation of the signals received.

Another advantage when using digital signal processors is that, once produced, a chip design for an evaluation chip for telephones can also be used for future chip generations. With digital logic, it is generally a simple matter to transfer the logic design to later generations of CMOS structures.

Digital processing also satisfies the increasing interest in convenient telephones. Thus, by way of example, the caller identifiers or else a message available in spoken form can be stored in a simple and flexible manner.

Advantageously, the first telephone operating signals received during the waiting mode include bell signals, charge-unit signals and caller identifiers. Charge-unit signals need to be received in the waiting mode insofar as these signals can also still be transmitted following completion of a call. Likewise, caller identifiers are transmitted from the exchange to the telephone in this mode.

The second telephone operating signals received during the call mode advantageously include charge-unit signals and caller identifiers.

One advantageous embodiment of the invention provides for the at least one integrated circuit to have separate inputs for the signals received in the waiting mode and the signals received in the call mode. The signals received in the waiting mode and in the call mode are routed via paths with different layouts. One reason for this is that the telecommunication authorities stipulate that no power can be drawn from the public telephone network in a waiting mode, that is to say when the receiver is on hook. In addition, the different paths prevent interference between the signals transmitted via the individual paths. The two paths designed for the signals received in the waiting mode and for the signals received in the call mode are routed to the integrated circuit via separate inputs. This allows the signals to be subjected to different (pre)processing in the integrated circuit too.

In line with one preferred embodiment of the invention, the signals received in the waiting mode and the signals received in the call mode are supplied to the downstream processing stages in multiplex mode. This measure means that the signals in both modes can be processed together. The multiplexer is preferably integrated on the at least one chip used for signal processing.

Another preferred embodiment of the invention is characterized in that the signal shaping device includes a voltage-dependent resistor which connects the access lines to the public telephone network to one another. A voltage-dependent resistor (varistor) is characterized by a nonlinear characteristic curve and conducts better at high voltages than at low voltages. In the event of large voltage spikes from the public telephone network, such as arise in the event of electromagnetic interference (lightning strike), for example, this component has a high resistance and thus acts as a first overvoltage protection element for the components arranged downstream. Voltage-dependent resistors are distinguished by low production costs.

Advantageously, the signal shaping device includes differential AC elements which decouple the signal path for the signals received in the waiting mode from the public telephone network. These differential AC elements are high-pass filters and transmit only the AC voltage component of the signals above a particular cut-off frequency. In the case of the signals in the public telephone network, this AC voltage component contains all the relevant information. Suppressing a DC voltage component prevents power from being drawn from the public telephone network.

Another advantage is that the signal shaping device has high-resistance voltage dividers which are arranged in the signal path downstream of the differential AC elements. These high-resistance voltage dividers are first used as further protection against voltage spikes, and second they ensure that the operating point of the signals received by the differential AC elements is in the range prescribed by the operating voltage of the telephone. In addition, the high-value form of the resistors results in low power consumption and high sensitivity.

In one particularly preferred embodiment of the invention, the signal shaping device includes at least one controllable amplifier unit. In addition, it is advantageous if the signal shaping device includes at least one circuit for determining the maximum level values, with the gain being set on the basis of the level values detected. It is particularly advantageous if the controllable amplifier unit and the circuit for determining the maximum level values are integrated on the at least one chip for signal processing.

The controllable amplifier unit allows the levels of the incoming signals to be set such that they fully exhaust the permitted voltage range for the circuits arranged downstream. In this case, the gain is preferably set on the basis of the detected maximum level value of the signals. This ensures that the signal evaluation has the highest possible sensitivity. In addition, very high incoming signal levels can be adjusted by small gain factors or even by gain factors less than 0 dB for the processing in the circuits arranged downstream.

In line with another advantageous embodiment of the invention, the at least one controllable amplifier unit is in the form of a range selector circuit for the analog/digital converter. The input range for analog/digital converters can be varied in powers of two. This means that the voltage range, which can be read in by the analog/digital converter, can be used in the best way possible in order to obtain the highest possible resolution for the digitized signals.

Another particularly preferred refinement of the invention is characterized in that the signal shaping device includes at least one frequency-selective attenuation element. A frequency-selective attenuation element represents a simple measure for attenuating a telephone signal of a particular frequency. By way of example, the charge-unit signals have a constant frequency of 12 kHz or 16 kHz and can be attenuated by such a frequency-selective attenuation element.

Another advantage is that the frequency-selective attenuation element is arranged in the signal path for the signals received in the call mode. Since all the signals received in the call mode are processed on the same path, this measure ensures that, in particular, the charge-unit signals cannot be heard by the user of the telephone, but they can nevertheless still be processed in the circuits arranged downstream.

The frequency-selective attenuation element advantageously includes a parallel resonant circuit whose resonant frequency matches, by way of example, the frequency of a particular type of received telephone operating signals. A parallel resonant circuit is characterized by an inductor connected in parallel with a capacitor and acts as a band rejection filter for incoming signals of a defined frequency. The resonant frequency is determined by the values of the capacitor and the inductor. By way of example, the frequency of the charge-unit signals is 12 kHz or 16 kHz and can be attenuated by the parallel resonant circuit if the components of the circuit are of suitable design.

Another advantage is that a resistor is connected in parallel with the parallel resonant circuit. This measure has the advantage that the received signals, whose frequencies are in the range of the resonant frequency of the parallel resonant circuit, are attenuated just to the extent that they can still be processed by the circuits arranged downstream. In particular, such a circuit can be used to align the level of the charge-unit signals with the level of the audio signals.

In line with another preferred embodiment of the invention, the signal shaping device includes overvoltage protection elements for protecting the inputs of the at least one integrated circuit. By way of example, zener diode circuits can be used for these overvoltage protection elements. Another advantage of these components is that signals having a large signal amplitude are clipped and that signal level matching is effected in this way. In particular, this applies to the bell signals, which have high level values.

The inventive method for processing telephone operating signals and audio signals in a telephone includes the following steps:

a) first telephone operating signals are received in the waiting mode and second telephone operating signals and audio signals are received in the call mode;

b) level matching is performed depending on the mode and/or on the type of telephone operating signals received; and c) both the audio signals and the telephone operating signals are evaluated together.

The signals received via the public telephone network have very different signal levels. In order to allow them to be evaluated together, they first need to be shaped such that they are in a similar level range after shaping. Evaluating all the telephone operating signals and audio signals together drastically reduces the number of electronic components required for signal processing. This allows the inventive method to be operated less expensively than previous methods.

Other features which are considered as characteristic for the invention are set forth in the appended claims.

Although the invention is illustrated and described herein as embodied in a telephone for connection to a public telephone network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
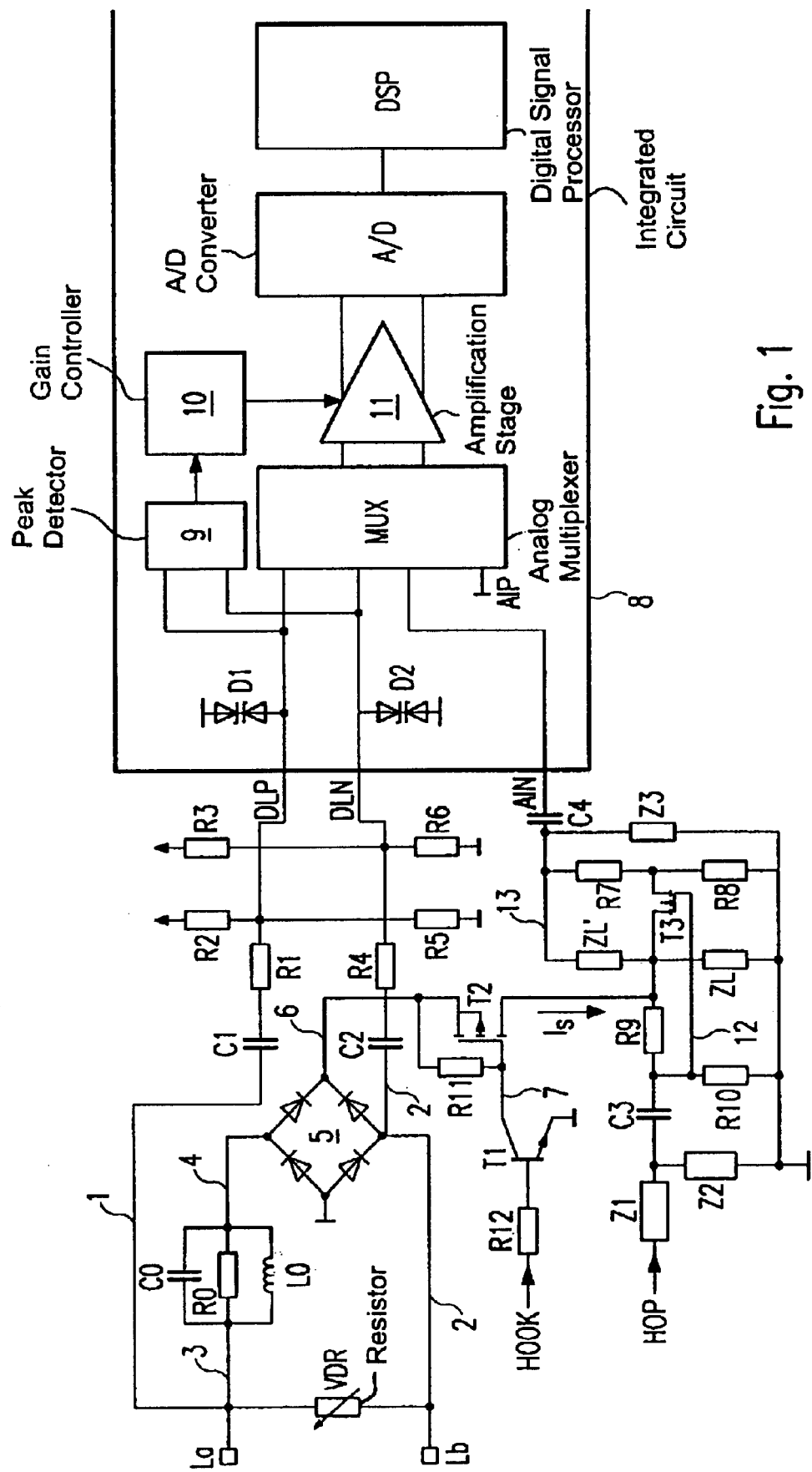
FIG. 1 is a block diagram of the inventive telephone, in which the telephone signals are processed in digital form.

Referring now to the figures of the drawing in detail and first, particularly, to FIG. 1 thereof, there is shown a block diagram of the inventive telephone. The public telephone network is used for transmitting both audio signals and telephone operating signals. The connection to the respective public telephone network is generally made via two access lines, denoted La and Lb in FIG. 1. In addition, further access lines can be provided. By way of example, the German public telephone network standard makes provision for an additional wakeup line and a ground line, which means that a telephone access facility includes four telephone lines.

Between the access lines La and Lb, there is constantly a DC voltage of approximately 60 V. The access lines La and Lb are used to transmit both the audio signals and the other telephone operating signals. One of these operating signals is the bell signal or ringing signal, which signals incoming calls. In this context, the DC voltage of 60 V has an AC voltage component with a frequency of 15 to 75 Hz superimposed on it. This superimposed AC voltage component has an amplitude of likewise approximately 60 V, which means that the total signal can have an amplitude of up to 120 V.

In addition, the access lines La and Lb are used to transmit charge-unit signals, which are also referred to as meter pulse signals. These are AC voltage signals of defined duration (100 msec), with every transmitted pulse indicating an accumulated charge unit. In current European telephone network standards, frequencies of 12 kHz and 16 kHz are provided for the meter pulse signal. The amplitude of the meter pulse signal is 12 V and thus corresponds to approximately four times the amplitude of the audio signal.

In the case of incoming calls, a caller identification signal (also referred to as caller ID) is transmitted in order to be able to show the called party the caller's telephone number. To transmit this caller ID, two different standards are used in Europe, FSK (Frequency Shift Keying) and DTMF (Dual Tone MultiFrequency). In the FSK standard, the caller identifiers are frequency-modulated, while the DTMF method involves the use of a tone dialing sequence to transmit the call number. The amplitude of the caller ID signal is in the order of magnitude of 2 V, that is to say roughly in the order of magnitude of the audio signals.

In addition, some public telephone network standards make provision for a polarity reversal signal ("line reversal"), where the polarity of the access lines La and Lb is swapped. This polarity reversal signal is not provided in all European standards, however.

The two access lines La and Lb are shown on the left-hand side of FIG. 1. These access lines are connected by a voltage-dependent resistor VDR, which during normal operation has a high value (>1 MΩ) and draws little current. This voltage-dependent resistor VDR has a nonlinear current/voltage characteristic curve; at high applied voltages, it becomes increasingly conductive. This allows downstream circuit parts to be effectively protected against any voltage spikes which may occur (electromagnetically injected interference, lightning strike etc.), because the respective overvoltage occurring is discharged.

A telephone is used in two operating modes, in a waiting mode when the receiver is on hook and in a call mode. The specifications from the respective telecommunication authorities allow no power to be drawn from the public telephone network during the waiting mode. When the receiver is on hook, therefore, a resistance of at least 1 MΩ (in some standards 10 MΩ) needs to be provided between the access lines La and Lb.

It is nevertheless necessary to be able to receive and evaluate telephone operating signals during the waiting mode as well. In the case of the circuit shown in FIG. 1, these signals (ringing signal, caller ID, meter pulse signals) are provided with a separate transmission path which includes the signal lines 1 and 2, the capacitors C1 and C2 and the resistors R1 to R6.

The path provided for the call mode signals includes the signal lines 2 and 3 and a band rejection filter which includes the capacitor C0, the resistor R0 and the inductor L0. The signal line 4 connected to the output of the band rejection filter and the signal line 2 are routed to the bridge rectifier 5. The line 6 for the call signal connects the output of the bridge rectifier 5 to the p-channel MOSFET T2.

During the waiting mode, the call path is in an inactive state. This is done by the HOOK signal which is applied to the base of the npn transistor T1 via the resistor R12. In the waiting mode, that is to say with the receiver on hook, the HOOK signal turns off the transistor T1. This pulls the signal line 7 connected to the gate of the p-channel MOSFET T2 to a positive potential via the resistor R11, and the p-channel MOSFET T2 turns off. During the waiting mode, there is therefore no call current $I_s$ flowing. This satisfies the requirement that no power be drawn from the public telephone network during the waiting mode.

The signals received in the waiting mode, that is to say the ringing signal, the meter pulse signal and the caller identifiers, are supplied via the signal lines 1 and 2 to the capacitors C1 and C2, which act as AC elements together with the resistors arranged downstream and transmit only the AC voltage component of the signals applied to La and Lb.

The resistor R1 has a high-resistance voltage divider connected downstream of it which includes the resistors R2 and R5. Similarly, the output of the resistor R4 feeds the voltage divider which is made up of R3 and R6. These high-resistance, discrete voltage dividers are used as protection against high voltages, which always occur on telephone lines. In addition, they are used to stipulate the signal offset which is between VSS and VDD and is defined by the ratio of R2 to R5 (and of R3 to R6). The AC voltage component of the received signals is based on these signal offsets and is supplied to the inputs for waiting mode signals DLP and DLN in the integrated circuit 8. The inputs DLP and DLN are in the form of differential signal inputs so that interference acting equally on both signal lines can be eliminated.

The rest of the signal processing is performed by the integrated circuit or microchip 8, on which all the units used for further signal processing are integrated. The inputs DLP and DLN on the integrated circuit 8 for the waiting mode signals are respectively protected by one of the two overvoltage protection elements D1 and D2. These overvoltage protection elements include zener diodes, with one diode always being polarized in the forward direction and the other diode always being polarized in the reverse direction, irrespective of the polarity of the incoming signal. These elements are intended to protect the downstream components of the integrated circuit against high incoming voltage spikes. In addition, the signal amplitudes of the bell signals are clipped.

The inputs DLP and DLN of the integrated circuit 8 are connected to the analog multiplexer MUX. The input AIN for the call mode signals is also connected to the analog multiplexer MUX. The call mode signals are in the form of single-ended signals and are converted together with the ground AIP by the analog multiplexer MUX. The analog multiplexer MUX forwards the signals applied to its inputs to the analog amplification stage 11 on two signal lines.

In addition, the inputs DLP and DLN of the integrated circuit 8 are connected to the signal peak detector 9. This ascertains the waiting mode signals' maximum voltage values that are applied to these inputs and forwards this information to the gain controller 10. The task of the gain controller 10 is to set the gain factors for the analog amplification stage 11 for the waiting mode signals such that the full permitted voltage range for the downstream components is used as much as possible. For this purpose, the gain factors 0 dB, 6 dB, 12 dB and 18 dB are available. Normally, the gain controller 10 selects the highest sensitivity, and only for high signal levels is the gain factor appropriately reduced. By contrast, the gain factor for the call mode signals always has a constant value.

The signals amplified by the analog amplification stage 11 are forwarded to the analog/digital converter A/D. This converts the analog signals into digital signals, so that they can be processed further by the downstream digital signal processor DSP. The digital signal processor DSP allows analysis and separation of the various signals. This means that, by way of example, caller identifiers or charge-unit signals can be displayed on a digital display on the telephone. The audio signals can then be converted back into analog signals by a digital/analog converter in order for them to be rendered audible in the receiver or loudspeaker.

If the telephone needs to be changed over from the waiting mode to the call mode, then such a voltage as turns on the npn transistor T1 is applied to the input HOOK. This means that the gate of the p-channel MOSFET T2 is at ground, and a call current $I_s$ can flow through the component as a drain current. This current drains through the common ground primarily via the transmission transistor T3, the resistor R8 and the line impedance ZL. The call current $I_s$ is modulated by the voice signals received and is applied to the input AIN for call mode signals via the coupling capacitor C4.

In the call mode, signals additionally enter the circuit via the input HOP. These are the voice signals from the user of the telephone. They are first shaped by a voltage divider made up of the impedances Z1 and Z2. Only their AC voltage component can then pass through the capacitor C3. The voltage divider including the resistors R9 and R10 forwards a fraction of this signal via the gate line 12 to the gate of the transmission transistor T3. The transmission transistor T3 is modulated with the frequency of the voice signal HOP. This also modulates the call current Is with the AC voltage component of the voice signal HOP, which means that the other, remote telephone subscriber receives a current $I_s$ modulated in line with the voice signal.

The Wheatstone bridge including the line impedances ZL and ZL', the resistors R7 and R8, the transmission transistor T3 and the additional impedance Z3 causes the signal which is on the node 13 to be modulated only in line with the voice signals from the remote party to the call. These voice signals are supplied to the integrated circuit 8 via the coupling capacitor C4 and the input AIN. The Wheatstone bridge causes the separate voice signals from the telephone subscriber, which are injected via HOP, not to be present on the node 13 and hence also not to be audible. The purpose of the Wheatstone bridge is thus to suppress the voice signals HOP transmitted by the user of the telephone in the reception path for the call mode signals so that the user does not hear his own voice in the receiver.

Figure 2:
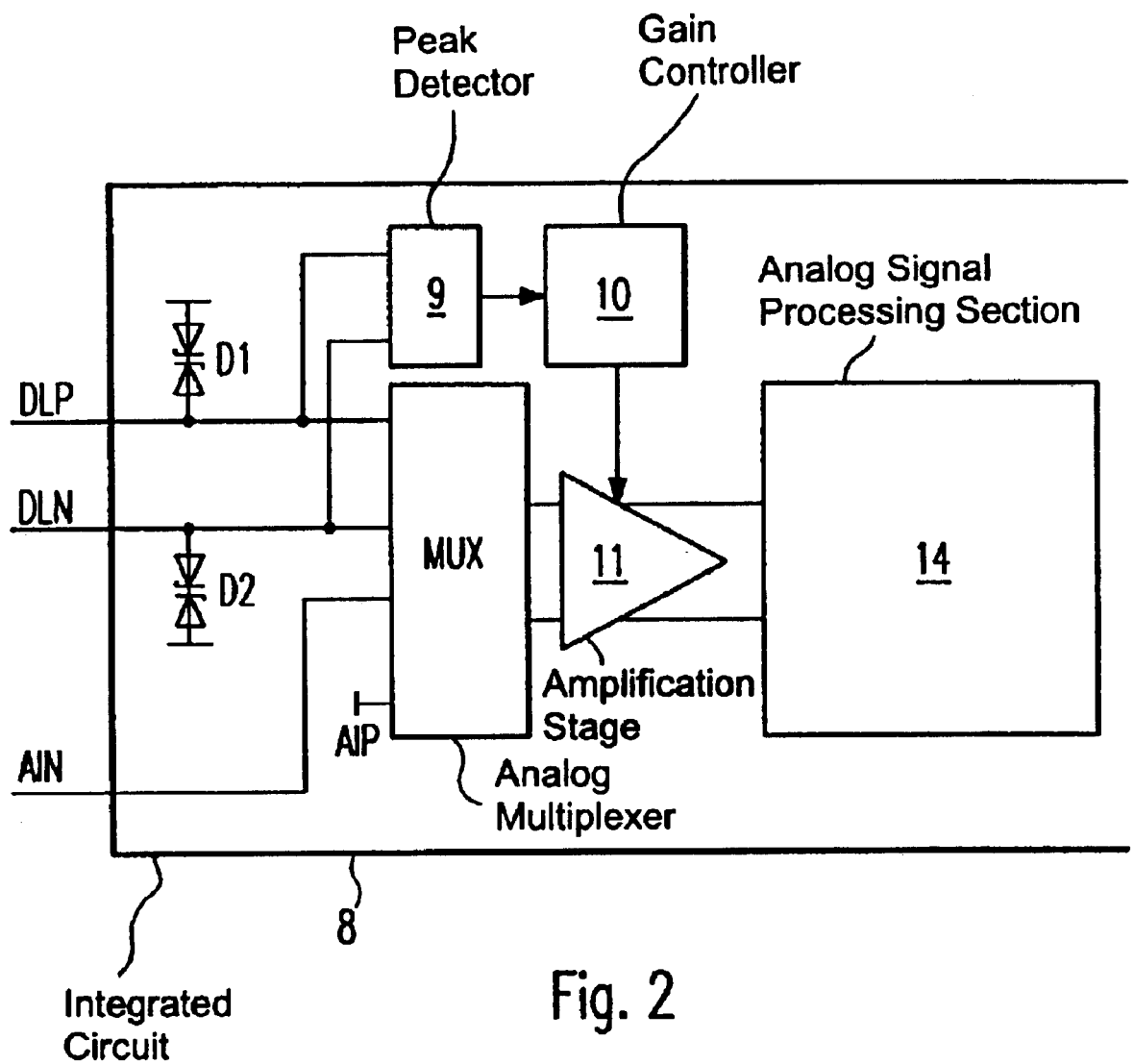
FIG. 2 is a corresponding circuit for a telephone for analog signal processing.

FIG. 2 shows the integrated circuit 8 for a telephone in which the signals are processed entirely in analog form. Again, the waiting mode signals are applied to the inputs DPL and DLN of the integrated circuit 8. The components downstream are protected against large voltage spikes by the overvoltage protection elements D1 and D2. Together with the call mode signals applied to the input AIN, the waiting mode signals are converted to two signal lines by the analog multiplexer MUX.

To this end, the signal peak detector 9 ascertains the maximum voltages of the waiting mode signals, so that the gain controller 10 can set the gain factor for the analog amplification stage 11 for the waiting mode signals. For this purpose too, the gain factors 0 dB, 6 dB, 12 dB and 18 dB are available. The call mode signals are amplified by the analog amplification stage 11 using a constant gain factor. The signals are then forwarded to the analog signal processing section 14. At that point, all the signals are separated by analog filter circuits and are analyzed.

What is claimed is:

1. A telephone for connection to a public telephone network, comprising:
   a signal shaping device for obtaining first telephone operating signals in a waiting mode and for obtaining audio signals and second telephone operating signals in a call mode, said signal shaping device providing shaped first telephone operating signals in the waiting mode and providing shaped audio signals and shaped second telephone operating signals in the call mode; and
   a microchip for processing the shaped first telephone operating signals, the shaped audio signals, and the shaped second telephone operating signals;
   said microchip having separate respective inputs exclusively for obtaining the first telephone operating signals in the waiting mode and exclusively for obtaining the second telephone operating signals and the audio signals in the call mode.

2. The telephone according to claim 1, wherein said signal shaping device adjusts a signal level of the first telephone operating signals, the audio signals, and the second telephone operating signals depending on a type of signal obtained.

3. The telephone according to claim 1, wherein said signal shaping device adjusts a signal level of the first telephone operating signals, the audio signals, and the second telephone operating signals depending on whether the telephone is in the waiting mode or the call mode.

4. The telephone according to claim 1, wherein said microchip is an integrated analog circuit.

5. The telephone according to claim 1, wherein said microchip includes an analog/digital converter unit and a digital signal processor unit configured downstream from said analog/digital converter unit.

6. The telephone according to claim 1, wherein the first telephone operating signals obtained during the waiting mode include bell signals, charge-unit signals, and caller identifiers.

7. The telephone according to claim 1, wherein the second telephone operating signals received during the call mode include charge-unit signals and caller identifiers.

8. The telephone according to claim 1, wherein:
   said microchip has a plurality of inputs; and
   said signal shaping device includes a plurality of overvoltage protection elements for protecting said plurality of inputs of said microchip.

9. The telephone according to claim 1, further comprising a downstream processing stage for receiving, in a multiplex mode, the first telephone operating signals in the waiting mode and the second telephone operating signals and the audio signals in the call mode.

10. The telephone according to claim 1, further comprising:
    a plurality of access lines for connection to a public telephone network;
    said signal shaping device including a voltage-dependent resistor connecting said plurality of access lines to one another.

11. The telephone according to claim 1, further comprising:
    a signal path for the first telephone operating signals in the waiting mode;
    said signal shaping device including differential AC elements for decoupling the signal path from a public telephone network.

12. The telephone according to claim 11, wherein said signal shaping device includes high-resistance voltage dividers configured in the signal path downstream from said differential AC elements.

13. The telephone according to claim 1, wherein said signal shaping device includes at least one controllable amplifier unit.

14. The telephone according to claim 13, wherein said signal shaping device includes at least one circuit for determining maximum level values, said controllable amplifier unit having a gain being set by said level values.

15. The telephone according to claim 13, wherein:
    said microchip includes an analog/digital converter; and
    said controllable amplifier unit is a range selector circuit for said analog/digital converter.

16. The telephone according to claim 1, wherein said signal shaping device includes at least one frequency-selective attenuation element.

17. The telephone according to claim 16, further comprising:
a signal path for obtaining the second telephone operating signals and the audio signals in the call mode;
said frequency-selective attenuation element configured in the signal path for obtaining the second telephone operating signals and the audio signals in the call mode.

18. The telephone according to claim 16, wherein said frequency-selective attenuation element includes a parallel resonant circuit.

19. The telephone according to claim 18, wherein said parallel resonant circuit has a resonant frequency matching a frequency of a particular type of received telephone operating signals.

20. The telephone according to claim 18, further comprising a resistor connected in parallel with said parallel resonant circuit.

21. The telephone according to claim 1, wherein said microchip includes a multiplexer driven by said separate inputs, and an amplifier unit connected to said multiplexer.

22. The telephone according to claim 21, wherein said amplifier unit is a controllable amplifier unit.

* * * * *